Inventor
Arthur F. Naylor
By Hill, Sherman, Meroni, Gross & Simpson
Attys.

Inventor
Arthur F. Naylor
By Hill, Sherman, Meroni, Gross & Simpson
Attys.

Inventor
Arthur F. Naylor
By Hill, Sherman, Meroni, Gross & Simpson
Attys.

Inventor
Arthur F. Naylor
By Hill Sherman Meroni Gross & Simpson
Attys

Feb. 27, 1962 A. F. NAYLOR 3,023,373

PRECISION VARIABLE FREQUENCY GENERATOR

Filed May 15, 1958 6 Sheets-Sheet 5

Inventor
Arthur F. Naylor
By Hill Sherman Meroni Gross & Simpson
Attys

Inventor
Arthur F. Naylor
By Hill Sherman Meroni Gross & Simpson
Attys 3,023,373

PRECISION VARIABLE FREQUENCY GENERATOR

Arthur F. Naylor, Cleveland, Ohio, assignor to Thompson Ramo Wooldridge Inc., a corporation of Ohio Filed May 15, 1958, Ser. No. 735,589
13 Claims. (Cl. 331—40)

This invention relates to a precision variable frequency generator.

It is an object of the invention to provide a precision variable frequency generator whose error is of essentially constant magnitude, rather than a constant percentage, over a relatively wide frequency range.

Another object of the invention is to provide a variable frequency generator having a high degree of stability and accuracy, a wide frequency range and automatic tuning.

A further object of the invention is to provide a relatively simple variable frequency generator utilizing a minimum number of oscillators, mixers, and tuned circuits, and imposing only modest limits on individual circuit stability or selectivity.

Still another object of the invention is to provide a variable frequency generator affording convenient and efficient frequency selection.

A more specific object of the invention is to provide a novel binary control system for a precision variable frequency generator.

A further more specific object of the invention is to provide a variable frequency generator utilizing a special limited-doublet binary system for limiting the range over which components must operate and accommodating a minimum of switching control equipment.

Another and further object of the invention is to provide a variable frequency generator which eliminates spurious frequencies in its output.

It is also an object of the invention to provide an extremely rugged and dependable precision variable frequency generator.

More specifically, it is an object to provide a precision variable frequency generator having a range of the order of from 1 to 1537 megacycles per second with a resolution of 10 kilocycles per second and a stability of about plus or minus 25 kilocycles per second over its entire frequency spectrum.

Other and further important objects, features and advantages of the present invention will be apparent from the following detailed description taken in connection with the accompanying drawings, in which.

As shown on the drawings.

Figure 1:
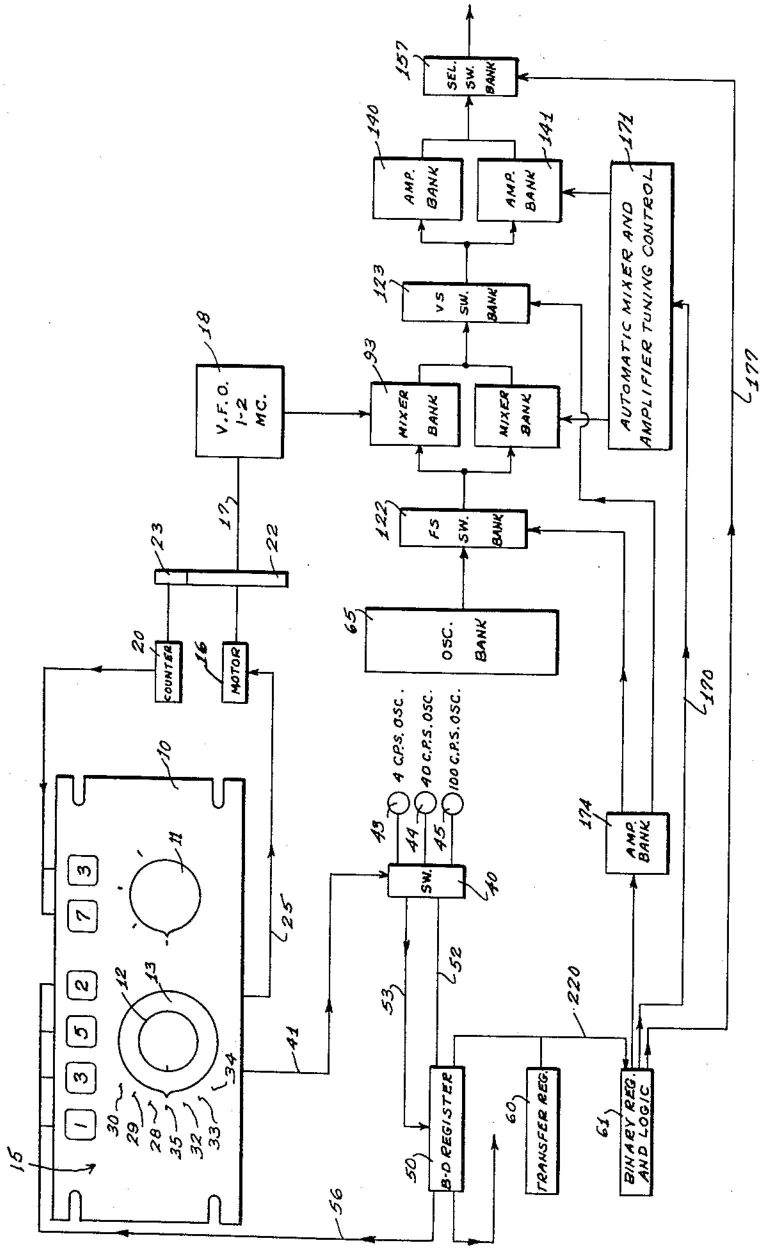
FIGURE 1 is a block diagram of a precision variable frequency generator in accordance with the present invention.

Referring to FIGURE 1, it will be observed that the variable frequency generator in accordance with the illustrated embodiment may comprise a control panel 10 having knobs 11, 12 and 13 for manual actuation to control the apparatus. The panel may also be provided with a visual frequency indicator generally indicated at 15 which will represent the frequency being delivered by the generator. In FIGURE 1, the frequency 1352.73 megacycles per second is indicated.

The knob 11 controls a four position switch. In "Off" position, the primary supply voltage is disconnected from the generator; in "Standby" position, the filament circuits and crystal ovens are energized; in "Carrier Off" position, all internal functions of the equipment are activated except for the output selector switch; and in "Carrier On" position, the output selector switch is energized to connect the generator to the output cable.

The inner knob 12 may be termed a vernier frequency control and is suitably coupled to a motor 16 driving a shaft 17 which is coupled to a variable frequency oscillator 18 for tuning the oscillator between 1 and 2 megacycles per second. The variable frequency oscillator 18 is preferably temperature compensated for stability of the order of plus or minus 10,000 cycles per second. The variable frequency oscillator is also preferably ruggedized to insure dependable operation. The dial calibration is preferably approximately linear over the required range of from 1 to 2 megacycles per second. The motor shaft 17 is coupled to a digital counter 20 by means of gears 22 and 23 and the digital counter 20 controls the last two positions of indicator 15 to the right of the decimal point. In the illustrated embodiment shaft 17 is at an angular position corresponding to a frequency of 1.73 megacycles per second for variable frequency oscillator 18. The frequency indicator is set to include the one megacycle per second contributed by variable frequency oscillator 18. The coupling between vernier control 12 and motor 16 is indicated by line 25.

The knob 13 on the control panel in the illustrated embodiment controls the coarse frequency adjustment as represented by the four digit positions to the left of the decimal point of frequency indicator 15. In the central position of the knob 13 indicated, the frequency of the generator remains that indicated by indicator 15, namely 1352 megacycles per second. If knob 13 is moved in the clockwise direction, the frequency is increased toward maximum frequency, and the rate at which the frequency is increased is controlled by the angular position of knob 13. Thus, positions 28, 29 and 30 correspond to slow, medium and fast increases in frequency, while positions 32, 33 and 34 counterclockwise from central position 35 correspond to slow, medium and fast reduction of the frequency delivered by the generator. In FIGURE 1, knob 13 is illustrated as being coupled to a transfer switch 40 by means of a line 41. The transfer switch 40 connects 4 cycle per second oscillator 43, 40 cycle per second oscillator 44, or 100 cycle per second oscillator 45 to binary decimal register or counter 50 depending on whether a slow, medium or fast rate of change of frequency is desired. Line 52 may represent the connection of one of the oscillators 43, 44 or 45 through transfer switch 40 with the binary decimal register 50 while line 53 may represent the control for determining whether register 50 adds or subtracts depending on whether the knob 13 is moved clockwise or counterclockwise from its central position 35. The information from the binary decimal register 50 controls electronic decimal numbering indicator 15 to the nearest megacycle as indicated by line 56.

The information in the binary decimal register 50 is sent to a transfer register or binary-decimal to binary converter 60 and then, in natural binary code, to binary register and logic component 61. In the illustrated embodiment, the number 1351 would have been sent to the binary register component 61 to require that the fixed frequency system generate a frequency of 1351 megacycles per second. The variable frequency oscillator 18 adds to this 1.73 megacycles per second to generate the frequency represented on the frequency indicator 15 in FIGURE 1.

A fixed frequency oscillator bank indicated at 65 comprises a series of fixed frequency sources or oscillators each of twice the frequency of the preceding oscillator.

Figure 2:
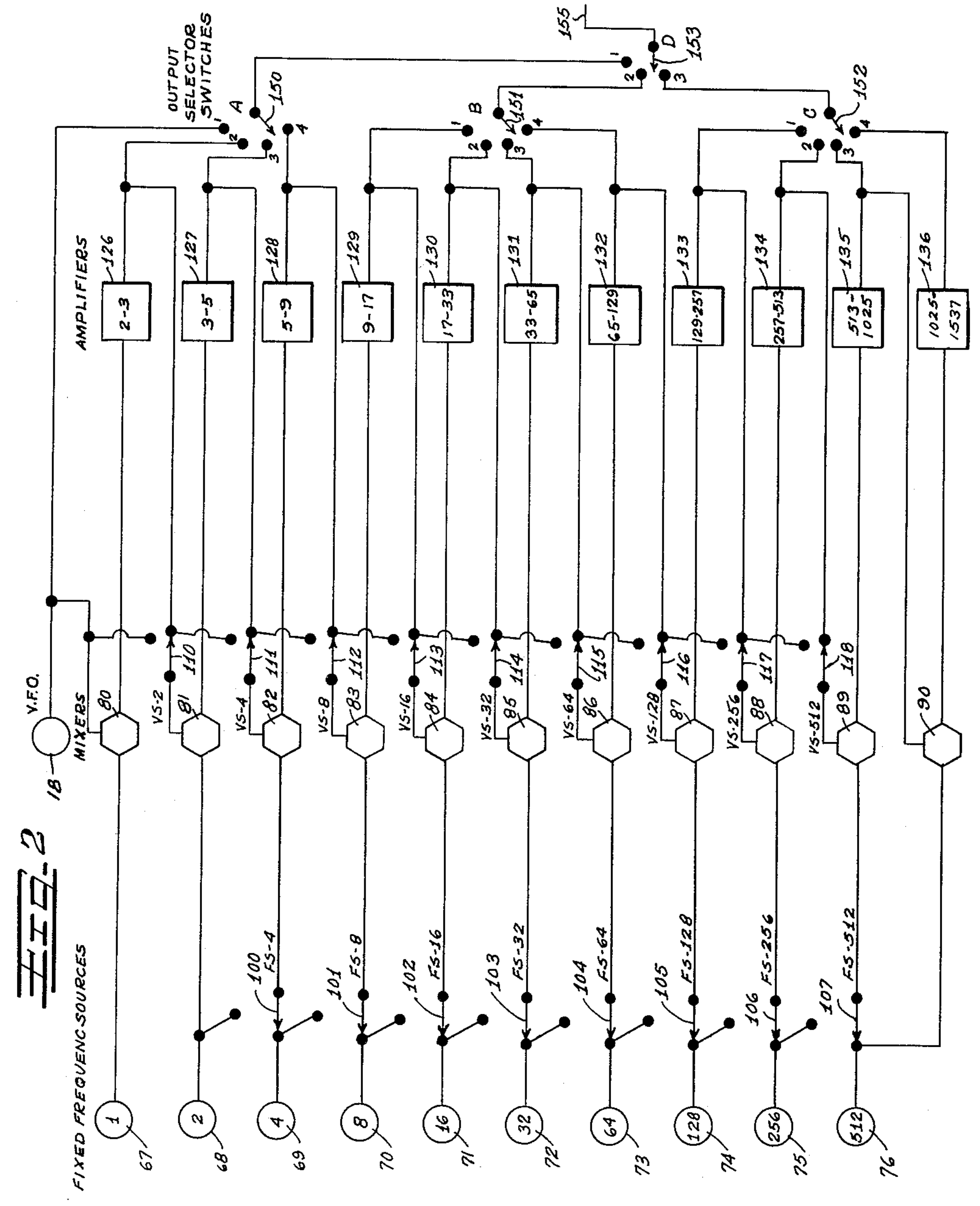
FIGURE 2 is a block diagram of certain components of the generator of FIGURE 1.

In the illustrated embodiment, the bank 65 may comprise ten fixed frequency oscillators 67 to 76 having frequencies of 1 megacycle per second, 2 megacycles per second, 4 megacycles per second, 8 megacycles per second, 16 megacycles per second, 32 megacycles per second, 64 megacycles per second, 128 megacycles per second, 256 megacycles per second and 512 megacycles per second as represented in FIGURE 2.

The outputs from the fixed frequency sources of bank 65 are suitably combined by means of mixers 80–90 shown in FIGURE 2 and arranged in two mixer banks 93 and 94 as illustrated in FIGURE 1. The outputs of the fixed frequency sources 67–76 are suitably combined under the control of two sets of switch arms 100–107 and 110–118 as represented by FS switch bank 122 and VS switch bank 123 in FIGURE 1. The outputs of the respective mixers 80–90 are connected to amplifiers 126–136 indicated as being arranged in two amplifier banks 140 and 141 in FIGURE 1. A series of selector switch arms 150, 151, 152 and 153 are positioned to connect the desired amplifier 126–136 to output cable 155, FIGURE 2, and the selector switches are represented by block 157 in FIGURE 1.

Figure 3:
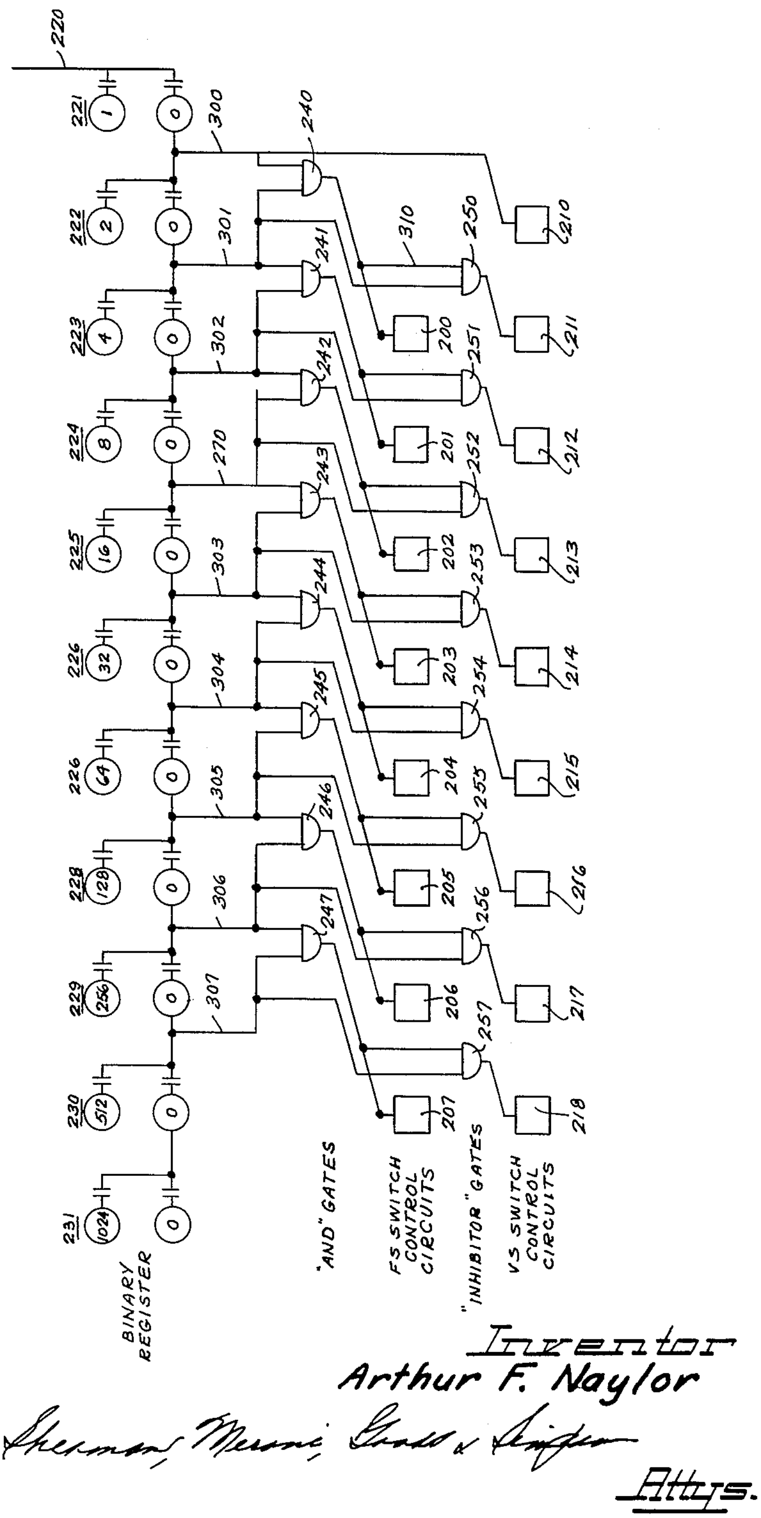
FIGURE 3 is a block diagram of the logical circuits for controlling switching in the generator of FIGURE 1.

The ten fixed frequency sources 67–76 in FIGURE 2 may operate at successive fixed frequencies in the range between 1 and 512 megacycles per second to provide frequencies at the output cable 155 anywhere in the range between 1 and 1537 megacycles per second in conformity with the embodiment illustrated in FIGURE 1 where frequency indicator 15 has been stated to be calibrated in megacycles per second. While operation in this frequency range is at present considered to be most significant, the circuit of FIGURES 1, 2 and 3 is, of course, directly applicable to any desired frequency range. For example, if output frequencies in the range from 1 to 1537 kilocycles per second were desired, sources 67 to 76 would provide successive frequencies in the range between 1 kilocycle and 512 kilocycles per second, and variable frequency oscillator 18 would provide frequencies between 1 and 2 kilocycles per second. Accordingly, there is no intention to limit the disclosure of FIGURES 1, 2 and 3 to the megacycle range, and the number designations within the circles representing sources 67 to 76 and within the blocks representing amplifiers 126–136 in FIGURE 2 are intended simply to represent relative values and might in an actual circuit represent kilocycles, tens of kilocycles, hundreds of kilocycles, megacycles or any other suitable units. The circuits of FIGURES 1, 2 and 3 thus have utility in other frequency ranges than the megacycle range which is a preferred example, and the drawings are specifically intended to illustrate the other frequency ranges referred to herein.

In the case where the circuits of FIGURES 1, 2 and 3 are taken to represent the megacycle range, fixed frequency sources 67–76 may comprise a crystal controlled oscillator 67 with the higher frequencies preferably derived from the fixed frequency output of oscillator 67 by doubling and quadrupling through selective tank circuits tuned to the desired frequency, such as 512 megacycles per second for frequency source 76. In the present state of the art, it is practical to use frequency doubling up to 2000 megacycles per second with efficiency and output sufficient for the present embodiment of the invention. The mixers or frequency adders 80–90 preferably operate by known heterodyning techniques. With the illustrated circuits, the mixer stages 80–85 which operate up to a frequency of 65 megacycles per second are preferably conventional grid-cathode mixers with untuned plate circuits. For mixers 86–90 handling frequencies above 65 megacycles per second, the tank circuit of the mixer will be tunable over the spectrum of frequencies indicated for the associated amplifiers 132–136. As illustrated in FIGURE 1 by line 170, continuous tuning information is derived from the binary register and logic component 61 and supplied to an automatic mixer tuning control indicated at 171 to control the tuning of mixers 86–90 in mixer bank 94. The tunable tank circuits of the mixers 86–90 preferably have a reasonable "Q" so as to realize gain and selectivity. Preferably also, the mixer subassemblies are minaturized plug-in packages to enable quick replacement in case of failure.

In the case where the amplifiers 126–136 are to operate in the megacycle range, amplifiers 126–133 utilize distributed amplifier technique. Gains in excess of 10 db have been achieved with band widths to 200 megacycles per second. Amplifiers 134–136 employ modified broad banding techniques approaching a tunable radio frequency amplifier, preferably with a reasonable "Q" so as to realize gain and selectivity. As represented by line 170 and block 171 in FIGURE 1, tuning of amplifiers 134–136 in bank 141 is controlled by means of binary register component 61 with actual tuning accomplished through the use of binary auto-positioners or through voltage tuned devices properly excited by an analog voltage derived from the binary register of component 61. The amplifiers are preferably designed in modular form for ease of replacement in case of failure, and are preferably designed for the utmost in maintainability and reliability.

Figure 4:
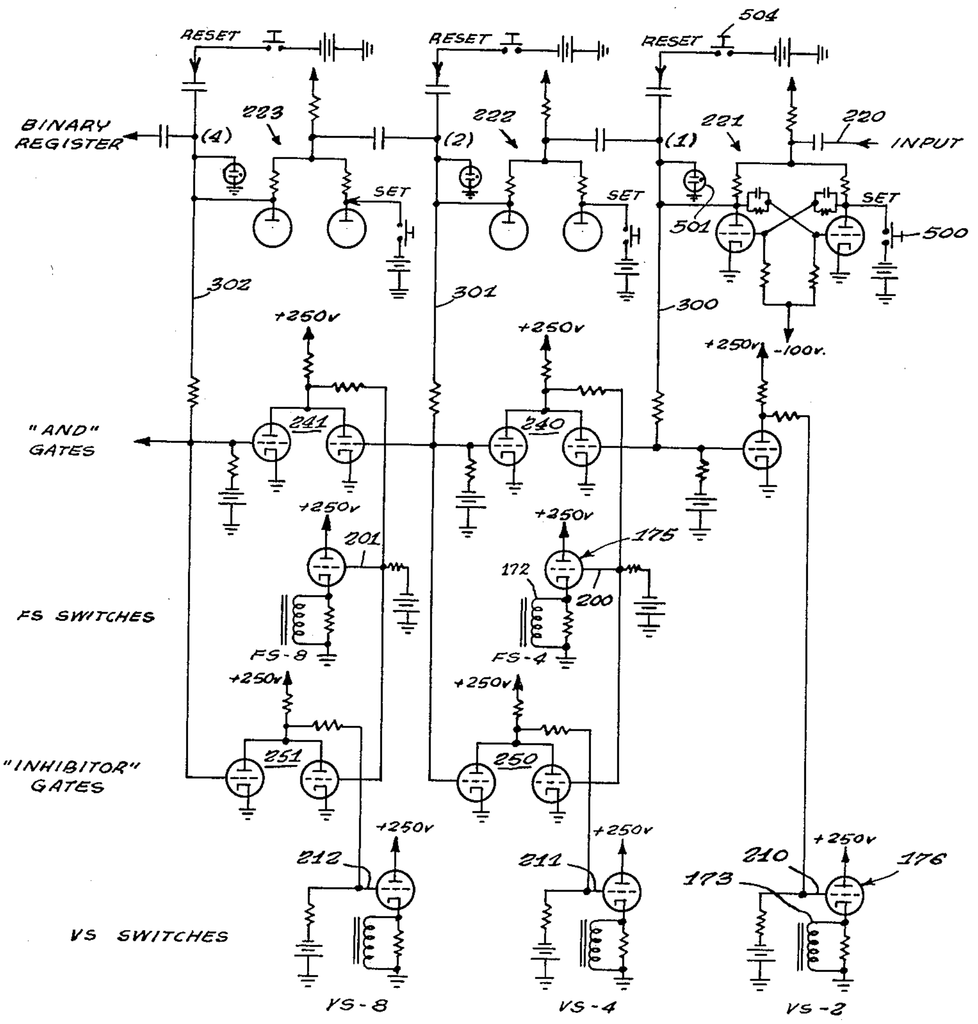
FIGURE 4 is an exemplary detailed circuit diagram implementing the block diagram of FIGURE 3.

The FS switches 100–107 and the VS switches 110–118 in the radio frequency range may be two position coaxial switches having solenoid actuating mechanisms such as indicated at 172 and 173 in FIGURE 4 which are energized under the control of binary register component 61 by means of an amplifier bank indicated at 174 in FIGURE 1 including amplifier units such as indicated at 175 and 176 in FIGURE 4.

Output switches represented at A, B, C and D in FIGURE 2 having arms 150–153 may comprise four position coaxial switches and are controlled from the binary register component 61 as indicated by line 177 in FIGURE 1. These switches preferably provide the maximum practical isolation and reduction of crosstalk between channels. The operation of the output selector switches A, B, C and D in FIGURE 2 involves the use of the frequency as given in the binary register of component 61 for connecting the output cable 155 to the proper amplifier 126–136. The output switches in conjunction with the other two sets of switches contribute to the elimination of spurious frequencies at the output cable 155.

In selecting a desired frequency in the illustrated embodiment, the operator adjusts coarse frequency control knob 13 so as to cause binary-decimal register 50 to count in a desired direction at the desired rate, without any readout from the binary-decimal register 50 to the transfer register 60. Binary-decimal register 50 simply counts up or down until a desired frequency appears at the indicator 15. The operator then moves the control knob 13 to central position 35 to set the register 50 at the count corresponding to the desired frequency. Vernier control knob 12 is actuated to set variable frequency oscillator 18 at a frequency to provide the desired decimal fraction at indicator 15. When control knob 13 has been set back to central position 35, readout from register 50 is initiated to adjust the various components so as to deliver the selected frequency.

It will be apparent that the present invention also comprehends the embodiment wherein variable frequency oscillator 18 is omitted or replaced by a fixed frequency oscillator such as of 1 megacycle and the system is utilized to generate frequencies over a given range in unit steps. It is considered that the diagram of FIGURE 2 comprehends the embodiment of a fixed oscillator in place of variable frequency oscillator 18, since this embodiment is achieved by simply setting variable frequency oscillator 18 at 1 megacycle per second, for example.

Certain details of the binary register and logic component indicated at 61 in FIGURE 1 are shown in FIGURES 3 and 4. The circuitry of FIGURES 3 and 4 provides means for controlling actuation of switches 100–107 and 110–118 so as to produce a frequency at output cable 155 corresponding to the number counted into register 50 in FIGURE 1. Thus, blocks 200–207 in FIGURE 3 represent control circuits for the respective amplifier units of bank 175 in FIGURE 1 which in turn control the switch arms 100–107 in FIGURE 2. Similarly blocks 210–218 in FIGURE 3 represent control circuits for the respective amplifier units of bank 175 which control switch arms 110–118 in FIGURE 2.

By way of example, the amplifier units may comprise cathode follower stages such as indicated at 175 and 176 in FIGURE 4. Of course suitable power transistor stages could be substituted for the vacuum tube circuits illustrated if so desired. The control circuits 200–207 and 210–218 have been shown in FIGURE 4 as comprising the grid input leads to the cathode follower stages, but any other suitable circuits such as gating circuits may be utilized, if desired, for controlling the amplifier units. If gating circuits are used, they may be controlled from the reset output 219*a* of control flip-flop 219 of FIGURE 7.

The input from the transfer register 60 in FIGURE 1 is represented by the line 220 leading to a series of binary register units 221–231 corresponding to code positions 1–1024 in the binary code. It will be understood that the number recorded in the transfer register 60 may be delivered to units 221–231 in parallel so that the condition of each code position in register 60 is transmitted directly to the corresponding binary register unit 221–231 of FIGURE 3 under the control of a corresponding gate, for example. Alternatively, serial input to the binary register may be used as illustrated in FIGURES 3 and 4.

For example, if the number 1351 is delivered to register units 221–231 to correspond to the frequency represented on indicator 15 in FIGURE 1 (taking into account a setting of 1.73 of variable frequency oscillator 18) this number is represented in the binary code reading the most significant code position first as 10101000111. When this number is fed to register units 221–231, units 221, 222 and 223 will be in their "1" condition, units 224, 225 and 226 will be in their "0" condition, units 227, 229 and 231 will be in their "1" condition, and units 228 and 230 will be in their "0" condition.

The control circuits 200–207 and 210–218 are actuated by the respective register units under the control of "and" gates 240–247 and "inhibitor" gates 250–257. The "and" gates 240–247 are each actuated by a "0" (relatively low voltage) condition at the outputs such as 300 and 301 of two successive register units. The inhibitor gates 250–257 are each inhibited upon actuation of the associated "and" gate (corresponding to a relatively high output voltage from the "and" gate), but otherwise transmit an actuating signal (in the form of a relatively high output voltage) to the associated control circuit 211–218 upon a "0" condition of the associated register unit. The control circuits 200–207 are actuated upon actuation of the associated "and" gate to give a relatively high output current. In deactuated condition of control circuits 200–207 and 210–218, the associated solenoids such as 172 and 173 in FIGURE 4 are effectively deenergized and the associated switch arms are in their postions shown in FIGURE 2 which are designated their direct or "D" positions. When the control circuits are actuated due to "0" conditions in the associated register units, the corresponding solenoids are energized and the associated switches are moved to their offset or "0" positions.

Thus for the number 1351 in the register units 221–231, register unit 224 will be in "0" condition to actuate control unit 213 through lines 270 and 271 and inhibitor gate 252. Inhibitor line 273 of inhibitor gate 252 is not actuated since "and" gate 242 remains deactuated because of the "1" condition of register 223.

Since both register units 224 and 225 are in a "0" condition, "and" gate 243 is actuated to actuate control unit 203 and place inhibitor gate 253 in blocking condition through inhibitor line 277. Thus the zero condition of unit 225 fails to actuate control unit 214. Similarly, control unit 204 is actuated and control unit 215 is not actuated. The "0" condition of unit 228 causes actuation of control unit 217.

With this condition of the logic circuitry associated with the binary register, switch arms 103 and 104 are actuated and switch arms 113 and 117 are actuated. If variable frequency oscillator 18 is set to 1.73 megacycles to correspond with indicator 15 in FIGURE 1, the first mixer 80 will receive a 1 megacycle frequency from oscillator 67 at a first input and will receive a frequency of 1.73 megacycles at a second input to provide an output of 2.73 megacycles to amplifier 126. The output of amplifier 126 is connected by switch 110 in its direct position to one input of mixer 81 to provide an output of 4.73 megacycles to the second amplifier 127. The output of the amplifier 127 is delivered to mixer 82 which generates an output of 8.73 megacycles for amplifier 128. Since switch arm 113 is in its offset position, the output of amplifier 128 is connected to an input of mixer 84 to provide an output of 24.73 megacycles to amplifier 130. Since switch arm 103 is actuated to its offset position, mixer 85 receives a first input of 16 megacycles and an input from amplifier 130 of 24.73 megacycles to provide an output of 40.73 megacycles. With switch arm 104 in its offset position, mixer 86 receives an input frequency of 32 megacycles to provide an output of 72.73 megacycles. With switch arm 117 in its offset position, the output of amplifier 132 is connected to the input of mixer 88 to provide an output of 328.73 megacycles per second. At mixer 89, 512 megacycles is added to this value and at mixer 90 a further 512 megacycles per second is added to provide the total of 1352.73 megacycles per second represented on indicator 15 in FIGURE 1.

It will be observed that the circuits of FIGURES 2 and 3 do not operate on what may be termed a simple binary basis. On a simple basis, for the number 1351, fixed oscillators of frequencies of 1, 2, 4, 64, 256 and 1024 megacycles per second would be added in correspondence with the presence of "1" signals in the 1, 2, 4, 64, 256 and 1024 code positions in the binary code representation of the number 1351. Referring to the circuit of FIGURE 2, this would require a further position on each of switches 111–118, for example, in order to connect mixers 82–89 to the output of the variable frequency oscillator 18. A further contact would be required in conjunction with switch arm 112, for example, in order to connect mixer 83 directly to the output of amplifier 126. Each succeeding switch arm 113–118 would require progressively greater numbers of contacts so that each mixer second input could be connected directly to the output of any of the preceding mixer stages. It will be appreciated that this arrangement (not shown) is far more complex than the one actually illustrated in FIGURE 2.

The circuits of FIGURES 2 and 3 operate on a modified binary code which may be termed a special limited-doublet binary numbering system. Thus, referring to the number 1351 in its binary form and reading from the least significant binary position, it will be observed that the 0 in the eight position produces the normal action of excluding oscillator 70 in FIGURE 2 by actuation of switch arm 113 to offset position. The second zero at the sixteen position, however, does not produce the normal action, but instead causes actuation of switch arm 103. Thus, the sixteen megacycles from oscillator 71 is added both at mixer 84 and at mixer 85. Similarly because of the "second" zero at the thirty-two position, oscillator 72 is connected to mixer 86 and oscillator 73 which provides the 64 megacycles is disconnected. Thus, instead of connecting the output of mixer 82 directly to mixer 86, a chain is established for providing 16 megacycle signals at mixers 84 and 85 and a 32 megacycle signal at mixer 86. The sum 16+16+32 is of course equal to 64 megacycles per second. Thus, a continuous chain is preserved from the output of mixer 82 through switch arm 113 in offset position and mixers, 85 and 86, while still providing the required 64 megacycles per second frequency.

It will be apparent to those skilled in the art that the output switches A, B, C and D may also be controlled from the storage register units 221–231. Thus with all the register units in their zero condition, switch A must have arm 150 in the number 1 position and switch D must have arm 153 in its number 1 position. If the first register unit 221 has a one condition and all the other registers are zero, switch A must be in position two. If register unit 222 is in a one condition and all subsequent units 223–231 are in a zero condition, switch A must be in position number 3 regardless of the condition of register unit 221. This will be understood by referring to the ranges for which amplifiers 126–136 are adapted.

If register unit 222 is in a one condition the binary number is either 2 or 3 which when added to the output of the variable frequency oscillator 18 falls within the range of amplifier 127. If the unit 223 is the highest unit in a one condition, the binary number is equal to or less than seven, and switch A must be in position four at the output of amplifier 128. Thus, the rule for the positioning of switches A, B and C is that switch A must be in a position corresponding to the highest register unit of units 221, 222 and 223 in a one condition. If none of units 221, 222 and 223 is in a one condition, switch A must be in its number 1 position for switch B the position must correspond to the highest register unit of units 224–227 in a one condition; for switch C, the position must correspond to the highest unit of units 228–231 in a one condition. With respect to switch D, the position must number 1 if the highest register unit of units 221–231 in a one condition is 221, 222 or 223 or none of the units; switch D must be in position two if one of units 224–227 is the highest unit in a one condition; and switch D must be in its number 3 position if one of units 228–231 is the highest unit in a one condition.

It will thus be seen that with simple logical circuitry such as illustrated in FIGURES 2 and 3, a binary number input is operative to control switches 100–107, switches 110–118 and switches A–D. Such circuitry alone is operative to provide output frequencies between 1 and 1537 units, where the frequency band is not such as to require tuning of the mixers such as bank 94 in FIGURE 1 and of the amplifiers such as those in bank 141 in FIGURE 1. With additional circuitry such as indicated in FIGURE 1, the embodiment of FIGURES 1 to 3 is operative in the megacycle range to automatically provide an output between 1 and 1537 megacycles, for example. Switches A, B, C and D may, of course, be actuated manually if desired in a given application, and the disclosure in FIGURES 2 and 3 is intended to include this embodiment.

The circuitry of FIGURE 4 is included simply to show typical detailed circuits for implementing the disclosure of FIGURES 1 to 3. There is no intention to limit the disclosure of FIGURES 1 to 3 to the specific circuits of FIGURE 4 since many other suitable circuits will readily occur to those skilled in the art.

The binary register circuit of FIGURE 4 is taken from Millman and Taub "Pulse and Digital Circuits" McGraw-Hill Book Company, Inc. 1956, FIGURES 11–1, page 323, and FIGURES 5–15, page 163. The "and" circuits such as 240 and 241 in FIGURE 4 are disclosed in section 13–3 of Millman and Taub, and "inhibitor" circuits such as shown at 250 and 251 in FIGURE 4 are discussed in section 13–5 of Millman and Taub.

Figure 5:
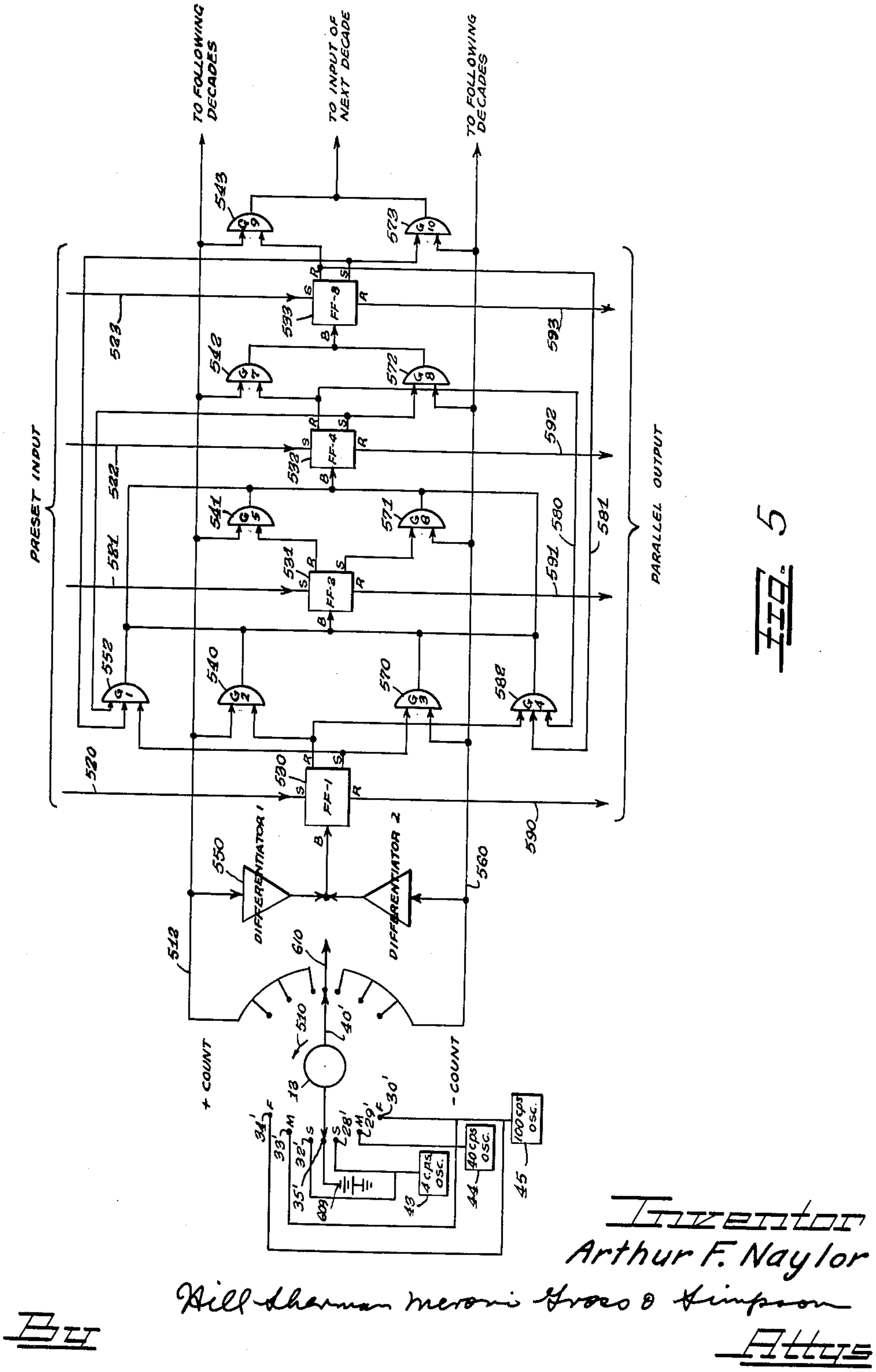
FIGURE 5 illustrates an exemplary stage of a suitable decade reversible binary decimal counter.

A stage of a suitable circuit for reversible binary decimal counter or register 50 of FIGURE 1 is illustrated in FIGURE 5. This general type of circuit is discussed at section 11–6 and sections 11–3 and 11–4 of Millman and Taub, supra, and the specific circuit of FIGURE 5 is shown merely by way of illustration and not of limitation. Other suitable circuits are well known to those skilled in the art.

Figure 6:
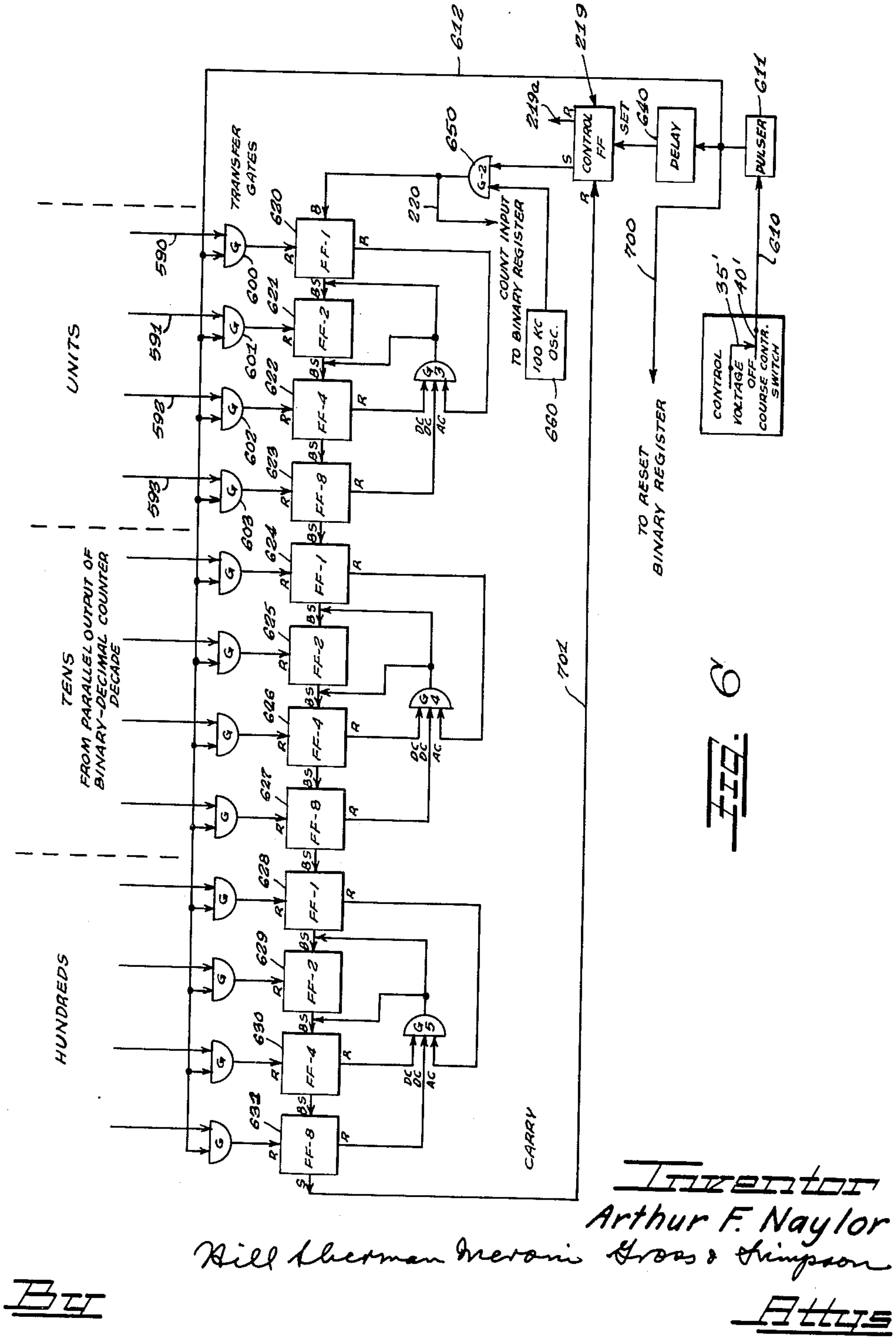
FIGURE 6 illustrates an exemplary binary-decimal to binary converter or transfer register.

FIGURE 6 illustrates a suitable exemplary circuit for transfer register 60 in FIGURE 1. This circuit serves to provide a reset pulse after a number of input pulses corresponding to the number transferred from the binary decimal register 50. Preset counters of this general type are discussed at page 345 of Millman and Taub, supra, and as there stated decade preset counters are commercially available. Such commercially available decade preset counters may be preset by push buttons to deliver a desired number of pulses to the binary register of FIGURES 3 and 4 as a modification of the illustrated embodiment, eliminating the need for the system of FIGURE 5.

As a further modification, the binary register units such as 221 may be set by push buttons such as indicated at 500 in FIGURE 4 to light neon lamps such as indicated at 501, from which the input number may be read in binary form, eliminating the need for the systems of FIGURES 5 and 6. Thus after resetting all units to "0" condition by reset push buttons such as shown at 504, the desired number may be introduced directly into the binary register manually by means of the set push buttons such as 500.

The operation of FIGURES 5 and 6 will be apparent to those skilled in the art. When knob 13 is turned in the counterclockwise direction as indicated by arrow 510 in FIGURE 5, pulses are delivered to the plus input line 512 from the selected oscillator 43–45 to cause the binary decimal counter to count in the increasing direction. The preset input lines 520–523 may be used to set the count to approximately the middle of the range after the equipment is turned on. The presetting action may occur at the end of the warm-up period, or whenever the equipment is switched from "Standby" to "On" condition. An excess three binary-decimal code is utilized in the embodiment of FIGURE 5. In counting in the increasing direction, the reset outputs of flip-flops 530–533 are delivered to the binary inputs of the succeeding flip-flops under the control of gates 540–543. It must be assumed that the incoming count pulses are wide compared to the switching time of the flip-flops. This insures that gates 540–543 are enabled long enough to allow any reset output to be coupled to the binary input of the following flip-flop. A differentiator 550 is shown here to provide narrow triggering pulses for flip-flop 530.

In the excess three code a "0" is encoded as a "2" in flip-flop 531 and a "1" in flip-flop 530. The counter operates in a straight binary fashion until nine pulses have been counted. At this time the "8" and "4" flip-flops 533 and 542 are on. The tenth pulse returns the counter to starting condition with flip-flop 531 and flip-flop 530 on. Gate 552 operates in the following manner to perform this function. When flip-flops 532 and 533 are set and flip-flop 530 comes on, a pulse is sent via gate 552 to the binary input of flip-flop 531 which turns it on (i.e. places it in "set" condition). The output of gate 552 is also coupled to the binary input of flip-flop 532 and returns it to reset condition, which in turn causes flip-flop 533 to reset. The count in the decade is now back to the starting condition with flip-flops 530 and 531 set.

In the reverse mode of this counter, that is when the input pulses are on the minus count line 560, gates 570–573 are effective to couple the set outputs of the flip-flops to the binary inputs of the following bits. Starting at zero again the first pulse must set the decade to nine which in excess three code is an 8 and a 4 bit. The logic now is that when flip-flops 532 and 533 are reset and flip-flop 530 is reset, flip-flop 531 must reset and flip-flop 532 and flip-flop 533 must be set. The bottom two control lines 580 and 581 of gate 582 are controlled by the D.C. reset outputs of flip-flops 532 and 533 while the reset output of flip-flop 530 senses the condition of the gate. When this condition is met the pulse from the output of gate 582 resets flip-flop 531, since it was previously set, and sets flip-flop 532 which in turn sets flip-flop 533. The next nine input pulses will cause the counter to work in a reverse binary fashion because in this mode the set output of each flip-flop is coupled to the binary input of the following stage via gates 570–573.

The four-wire parallel outputs 590–593 of the units decade shown in FIGURE 5 and in each of the successive decades are connected to transfer gates such as 600–603 in FIGURE 6. These outputs are also used to provide indication of the number stored in the counter as indicated by line 56 in FIGURE 1.

The function of the binary-decimal to binary converter of FIGURE 6 is to read the number stored in the binary decimal counter of FIGURE 5, convert it to a binary number, and insert it into the binary register of FIGURES 3 and 4. The readout process must be non-destructive so that the binary decimal counter of FIGURE 5 still provides the proper information to the indicator 15 of FIGURE 1. Transfer gates such as 600–603 are used to achieve this operation.

When the coarse control knob 13 is returned to off position, a pulse is sent from control voltage source 609 (FIGURE 5) via line 610 to a "pulser" 611 which delivers a suitable gating pulse via line 612 to the transfer gates such as 600–603. The state of the flip-flops controlling the other legs of the gates is then transferred to the register of FIGURE 6 including flip-flops 620–631. The parallel outputs such as 590–593 of the binary decimal counter of FIGURE 5 are from the reset output of each flip-flop. Each decade in the converter of FIGURE 6 is a reverse counter similar to those in the binary decimal counter of FIGURE 5. Initially every flip-flop in the converter register will be set, so that when information is transferred thereto, those bits that were reset in the binary decimal counter of FIGURE 5 will also be reset in the converter of FIGURE 6. This action constitutes a transfer of the number from the register of FIGURE 5 to the register of FIGURE 6.

The operation of the counter in FIGURE 6 is identical to the reverse mode in the binary decimal counter of FIGURE 5 except that fewer gates are required since only the reverse mode is utilized in FIGURE 6.

When the coarse control switch is returned to off position, the pulse from pulser 611 is delivered to delay 640 and after a short delay, control flip-flop 219 is set to enable gate 650. 100 kilocycle per second oscillator 660 will then deliver pulses to the binary input of flip-flop 620 and to the binary register input line 220. The number of pulses required to return the counter of FIGURE 6 to 0 equals the number stored in the counter. However, since the carry pulse from the last decade is used to reset the control flip-flop 219 and gate off the 100 kilocycle per second oscillator 660, one more pulse is required to generate this carry at the 0 to 9 transition. N+1 pulses have now been counted into the binary register of FIGURES 3 and 4, where N equals the original number stored in the converter register of FIGURE 6. A reset pulse may be generated each time the coarse control switch is returned to off position as indicated by line 700 in FIGURE 6. The carry pulse from flip-flop 631 via line 701 serves to reset control flip-flop 219 to disable gate 650 and terminate the delivery of pulses to the binary register via line 220.

The binary register of FIGURE 4 counts forward in a straight binary fashion. The reset output of each flip-flop such as 221 is connected to the binary input of the following stage such as 222.

For the particular binary-decimal to binary converter shown in FIGURE 6, if N is the number in the binary-decimal register of FIGURE 5 and also the number indicated on indicator 15, then two of the pulses transmitted to the binary register via line 220 should not be represented in the final binary register count, so as to take account of the one megacycle per second contributed by the variable frequency oscillator 18 and the extraneous pulse generated by the converter of FIGURE 6. This can be accomplished by using the reset pulse on line 700 to place the binary counter in such a condition that it represents one less than its full capacity; i.e., all stages in the set position except for the least significant stage which is in its reset position. After the second pulse on line 220 the binary register will be in its zero position, after the third pulse it will represent one, and so on. The binary register of FIGURES 3 and 4 will thus contain the number $N-1$ as required.

By way of example, the coarse control switch associated with knob 13 has been indicated as comprising a contact arm 40′ for connecting voltage source 609 (FIGURE 5) and contact 35′ with line 610 and pulse generator 611 in neutral position 35 of knob 13, and for connecting contacts 28′, 29′ and 30′ and 32′, 33′ and 34′ associated with oscillators 43–45 to plus count input line 512 and minus count input line 560 of the binary decimal register in positions 28–30 and 32–34, respectively, of knob 13.

*Summary*

In a preferred form of operation of the generator of FIGURES 1 to 3, the generator is utilized to provide any frequency within a predetermined range to output cable 155 in FIGURE 2. If it is desired, for example, to tune the generator to a frequency of 521.40 megacycles per second, knob 13 is turned counterclockwise to one of positions 32, 33 or 34 to cause one of oscillators 43, 44 or 45 to deliver pulses via line 52 to register 50. The register 50 will then count down at the selected rate. When the number 521 appears at indicator 15, knob 13 is moved to central position 35 to set the register 50 at the corresponding binary-decimal number. Vernier knob 12 may be moved counterclockwise causing rotation of shaft 17 of motor 16 and corresponding actuation of digital counter 20 until the number .40 appears to the right of the decimal point at indicator 15. The knob 12 is returned to its center position and shaft 17 will have tuned variable frequency oscillator to a frequency of 1.40 megacycles per second.

With the binary-decimal number corresponding to the desired frequency in register 50, register 50 is suitably actuated to deliver the binary-decimal number to transfer register 60 from whence it is delivered to the binary register and logic circuit 61 shown in detail in FIGURE 3. Register units 221–231 of binary register and logic circuit 61 are set in conditions corresponding to one less than the number shown by the indicator 15. For a binary number of 520, units 224 and 230 would be in a one condition, while the remaining units would be in a zero condition energizing lines 300–307. Actuating unit 210 would be energized to move switch arm 110 in FIGURE 2 to offset position bypassing mixer 80. "And" circuit 240 will be energized to deliver an inhibiting pulse via line 310 to prevent actuation of actuating circuit 211. "And" circuit 240 will also actuate actuating circuit 200 to move switch arm 100 to offset position connecting fixed oscillator 68 to the first input of mixer 82. "And" circuit 241 will also be energized preventing actuation of circuit 212 and energizing circuit 201 to move switch arm 101 to offset position in FIGURE 2 connecting oscillator 69 to the input of mixer 83. "And" circuit 242 is not energized nor is "and" circuit 243 because of the one condition of register unit 224. The zero condition of unit 225 will thus be transmitted by lines 303 and 312 and inhibitor gate 253 to actuating circuit 214 to cause switch arm 114 in FIGURE 2 to be moved to offset position. "And" circuits 244–247 will be energized because of the zero condition of units 225–229 of storage register 61, and this will cause the actuation of circuits 204–207 to actuate switch arms 104–107 in FIGURE 2.

With the logical circuits of FIGURE 3, it will be observed that instead of hooking oscillators 70 and 76 to a mixer to produce 520 megacycles by simple analogy with the binary code representation of the number 520, a chain of fixed oscillators is established providing two megacycles at mixer 81, two megacycles at mixer 82 and four megacycles at mixer 83 to correspond to the required eight megacycles. Mixer 84 is excluded from the chain by actuation by switch arm 114 to offset position, and 32 megacycles is supplied to mixer 85 and to mixer 86, sixty-four megacycles is supplied to mixer 87, 128 megacycles is supplied to mixer 88 and 256 megacycles is supplied to mixer 89 to provide the total of 512 megacycles per second.

By preserving a continuous chain of mixers in this manner, switching is greatly simplified, and the band width requirements for amplifiers 126–136 is greatly improved.

Selector switch arms 150–153 are properly positioned so that only the desired amplifier is connected to output cable 155. In the present instance where an output of 520+1.40 megacycles is desired, switch arm 152 is at position 3 connecting with amplifier 135, and switch arm 153 is in position 3. Thus, the outputs of the other amplifiers are effectively excluded from output cable 155.

The present application is a continuation-in-part of my copending application Serial No. 704,372, filed December 23, 1957.

It will be apparent that many modifications and variations may be effected without departing from the scope of the novel concepts of the present invention.

I claim as my invention:

1. In combination, a series of frequency sources, a series of frequency mixers, switch means for interconnecting said frequency sources and frequency mixers in different combinations to provide a plurality of output frequencies in addition to the output frequencies of said frequency sources, electrical register means for registering a number in electrical form, and means for setting said switch means in accordance with the condition of said electrical register means to produce a frequency related to said number by combination of said frequency sources and mixers, said switch means being operative to selectively connect the inputs of at least two of said frequency mixers with the output of each of said frequency sources.

2. In combination, means for generating a succession of output frequencies in a given range comprising a series of sources of fixed frequencies, a series of mixers and switch means for interconnecting said sources and mixers, counting means for generating numbers in electrical form related to output frequencies in said given range, means for causing said counting means to count up and down selectively to a desired number related to a desired frequency in said given range, and means coupled to said counting means and to said switch means for setting said switch means to produce the desired frequency related to said desired number registered by said counting means, said switch means being operative to selectively connect the inputs of at least two of said frequency mixers with the output of each of said frequency sources.

3. In combination, means for generating a succession of output frequencies in a given range comprising a series of sources of fixed frequencies, a series of mixers and switch means for interconnecting said sources and mixers, counting means for generating numbers in electrical form corresponding to output frequencies in said given range, means for causing said counting means to count up and down selectively to a desired number corresponding to a desired frequency in said given range, and means coupled to said counting means and to said switch means for setting said switch means to produce the desired frequency corresponding to said desired number registered by said counting means, said counting means having means associated therewith for providing a visible indication of the number registered in said counting means, said switch means being operative to selectively connect the inputs of at least two of said frequency mixers with the output of each of said frequency sources.

4. In combination, means for generating a series of output frequencies in a predetermined range including a series of frequency sources, a series of frequency mixers having first and second inputs and having outputs connected to the second inputs of the respective next succeeding mixers in said series, and a series of electrically actuated switches controlling interconnection of said sources and mixers, and having different combinations of settings corresponding to the respective output frequencies, counting means operative to register successive numbers corresponding to said series of output frequencies in said predetermined range, means controlling said counting means to cause the counting means to successively count through said successive numbers corresponding to said series of output frequencies, and means coupled to said counting means and responsive to the number registered therein to electrically actuate said switches to the combination of settings corresponding to the desired output frequency to cause said generating means to produce the corresponding output frequency.

5. In combination, means for generating a series of output frequencies in a predetermined range including a series of frequency sources, a series of frequency mixers having first and second inputs and having outputs connected to the second inputs of the respective next succeeding mixers in said series, and a series of electrically actuated switches controlling interconnection of said sources and mixers, and having respective different combinations of settings corresponding to respective output frequencies, counting means operative to register succesive numbers corresponding to said series of output frequencies in said predetermined range, means controlling said counting means to cause the counting means to successsively count through said successive numbers corresponding to said series of output frequencies, and means coupled to said counting means and responsive to the number registered therein to electrically actuate said switches to the combination of settings corresponding to the desired output frequency to cause said generating means to produce the corresponding output frequency, said controlling means having means for adjusting the rate of counting of said counting means through said successive numbers.

6. In combination, means for generating a succession of output frequencies in a predetermined range comprising a series of sources of fixed frequencies, a series of frequency mixers and switch means for interconnecting said frequency sources and frequency mixers to provide any of said succession of output frequencies, electrical counting means for generating numbers corresponding to said successive output frequencies, means coupled to said counting means and to said switch means for setting said switch means to produce an output frequency in accordance with the number registered by said counting means, means for controlling counting of said counting means through said successive numbers, and means for actuating said controlling means to initiate counting of said counting means, said sources of fixed frequencies providing a series of frequencies each twice the preceding frequency in said series, and said counting means being operative to generate said numbers in binary form, said switch means being operative to selectively connect the inputs of at least two of said frequency mixers with the outputs of each of said frequency sources.

7. In combination, means for converting a binary code signal representing a given number into a corresponding frequency comprising a series of sources of fixed frequencies, the frequency of each source being twice the frequency of the preceding source in said series, a series of frequency adders normally having first inputs connected to the respective sources of said series of frequency sources and having second inputs normally connected to the outputs of the respective preceding adders of said series of adders, means responsive to a first signal in a given code position of the binary signal to connect the second input of the adder following the adder having its first input connected to the frequency source corresponding to said given code position to the output of the adder preceding that connected to said frequency source corresponding to said code position.

8. In combination, means for converting a binary code signal representing a given number into a corresponding frequency comprising a series of frequency sources each providing a frequency twice the frequency of the preceding source in said series whereby the frequency of each source corresponds to a binary code position, a series of frequency adders having first inputs normally connected to the respective frequency sources of said series of sources and having second inputs normally connected to the outputs of the respective preceding adders of said series of adders, means responsive to a signal of a given type in successive code positions of the binary signal to normally interconnect said adders to exclude the frequency source whose frequency corresponds to the code position at which said signal of said given type occurs, and means responsive to signals of said given type in two successive code positions of the binary signal to disable the first-mentioned responsive means with respect to the second of said two successive code positions and for disconnecting the frequency source corresponding to the code position following the two successive code positions from the adder to which it is normally connected and for connecting said adder with the preceding frequency source corresponding to the second of said two successive code positions.

9. In combination, a series of fixed frequency sources each providing an output frequency of twice the output frequency of the preceding frequency source of said series, a series of frequency adders having first and second inputs and an output, a series of first switches each having a direct position for connecting a fixed frequency source with the first input of one of said adders and an offset position for connecting the first input of said one of said adders with the fixed frequency source preceding the one connected to said one adder in direct position, a series of second switches each having a direct position for connecting the output of an adder with the second input of the next succeeding adder and having an offset position for connecting the output of each adder with the second input of the adder following said next succeeding adder, a series of first and second switch actuating means for actuation to shift the respective first and second switches from direct to offset position, a series of binary register units corresponding to the successive first and second switches, a series of inhibitor gates having actuating inputs connected to the outputs of the respective register units and having outputs connected with the respective switch actuating means, means for normally energizing the respective second switch actuating means via said inhibitor gates to move the respective second switches to offset position upon actuation of the corresponding register units by one type of binary signal in a corresponding code position and for maintaining the respective second switch actuating means deenergized with the corresponding second switches in direct position upon receipt of the opposite type of binary input signal by the corresponding register unit, "and" gates each having respective inputs connected to the outputs of two successive register units and having its output connected to a corresponding one of said first switches and to an inhibitor input of a corresponding inhibitor gate, said corresponding inhibitor gate having its actuating input connected to the second in sequence of said two successive register units, means for actuating said "and" gate upon actuation of said two successive register units with said one type of binary input signal to inhibit said corresponding inhibitor gate and to prevent movement of the associated second switch to offset position, and means comprising said "and" gates for energizing said first switch actuating means upon actuation of the "and" gates by coincident actuation of successive register units by binary input signals of said one type to move the respective first switches to offset position.

10. In combination, a series of frequency sources, a series of frequency mixers, switch means for interconnecting said frequency sources and frequency mixers in different combinations to provide a plurality of output frequencies in addition to the output frequencies of said frequency sources, means for generating a number in electrical form, and means for setting said switch means in accordance with the condition of said number generating means to produce a frequency related to said number by combination of said frequency sources and mixers, said series of frequency sources providing a series of output frequencies each twice the preceding output frequency in said series, and said number generating means generating numbers in electrical binary form, said switch means being operative to selectively connect the inputs of at least two of said frequency mixers with the output of each of said frequency sources.

11. In combination, means for converting an electric code signal representing a given number into a corresponding frequency comprising a series of frequency sources providing successively different output frequencies, a series of frequency mixers having first and second inputs and an output, means for connecting the outputs of said frequency mixers to the second inputs of the respective next succeeding frequency mixers in said series of mixers, a series of electrically actuated switches having at least two active positions for selectively connecting each frequency source to the first inputs of at least two of said frequency mixers, means comprising said series of switches for selectively connecting said sources and mixers in a wide range of different combinations corresponding to a wide range of different output frequencies from the outputs of said mixers, electrical register means for registering any of a wide range of numbers corresponding to said wide range of different output frequencies, electrically actuating means for setting said switches in accordance with any of said wide range of different output frequencies, and electric logic means controlled by the number in said electric register means and operative to control said electric actuating means in accordance with said number in said electric register means to set said switches to positions corresponding to the output frequency represented by the number in said register means.

12. In combination, means for converting a binary code signal representing a given number into a corresponding frequency comprising a series of frequency sources each providing a frequency twice the frequency of the preceding source in said series whereby the frequency of each source corresponds to a binary code position, a series of frequency mixers having first and second inputs and an output, means for connecting the outputs of said frequency mixers to the second inputs of the respective next succeeding frequency mixers in said series of mixers, a series of electrically actuated switches having respective first terminal means connected to the respective frequency sources and having respective second terminal means connected to the first inputs of the respective frequency mixers, said switches each having third terminal means connected to a different frequency source from the first terminal means of said switch and having means for selectively establishing electrical continuity between said first and second terminal means and between said second and third terminal means to selectively connect the first input of each mixer with at least two frequency sources, means comprising said series of switches for selectively connecting said sources and mixers in a wide range of different combinations corresponding to a wide range of different output frequencies from said mixers, electrical number register means for registering any of a wide range of numbers corresponding to said wide range of different output frequencies in binary form, electric actuating means for actuating said switches, and electric logic means controlled by the number in said electric register means and operative to control said electric actuating means in accordance with said number in said electric register means to set said switches to positions corresponding to the output frequency represented by the number in said register means.

13. In combination, means for converting a binary code signal representing a given number into a corresponding frequency comprising a series of frequency sources each providing a frequency twice the frequency of the preceding source in said series whereby the frequency of each source corresponds to a binary code position, a series of frequency mixers having first and second inputs and an output, means for connecting the outputs of said frequency mixers to the second inputs of the respective next succeeding frequency mixers in said series of mixers, a series of electrically actuated switches having respective first terminal means connected to the respective frequency sources and having respective second terminal means connected to the first inputs of the respective frequency mixers, said switches each having third terminal means connected to a different frequency source than the first terminal means of said switch and having means for selectively establishing electrical continuity between said first and second terminal means and between said second and third terminal means to selectively connect the first input of each mixer with at least two frequency sources, means comprising said series of switches for selectively connecting said sources and mixers in a wide range of different combinations corresponding to a wide range of different output frequencies from said mixers, electrical number register means for registering any of a wide range of numbers corresponding to said wide range of different output frequencies in binary form, electric logic means controlled by the number in said electric register means and operative to control said electric actuating means to set said switches to positions corresponding to the output frequency represented by the number in said register means, a binary-decimal register for counting through successive numbers corresponding to said wide range of output frequencies, display means coupled to said binary-decimal register in decimal form, oscillator means for delivering pulses to said binary-decimal register to cause the binary-decimal register to count through successive numbers to a desired number corresponding to a desired output frequency, and means for transferring the number in said binary-decimal register to said electric register means.

References Cited in the file of this patent

UNITED STATES PATENTS

| | | |
|---|---|---|
| 1,823,716 | Young | Sept. 15, 1931 |
| 2,457,149 | Herbst | Dec. 28, 1948 |
| 2,476,840 | Colander | July 19, 1949 |
| 2,706,251 | Russell et al. | Apr. 12, 1955 |
| 2,749,442 | Hansel | June 5, 1956 |
| 2,827,567 | White | Mar. 18, 1958 |
| 2,891,157 | Hansel | June 16, 1959 |